United States Patent
Dow

(10) Patent No.: US 8,018,452 B1
(45) Date of Patent: Sep. 13, 2011

(54) INCREMENTAL UPDATE OF COMPLEX ARTWORK RENDERING

(75) Inventor: Gordon B. Dow, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 893 days.

(21) Appl. No.: 11/769,571

(22) Filed: Jun. 27, 2007

(51) Int. Cl.
 *G06T 1/00* (2006.01)
 *G09G 5/36* (2006.01)

(52) U.S. Cl. ......... 345/418; 345/684
(58) Field of Classification Search ............ None
See application file for complete search history.

(56) References Cited

U.S. PATENT DOCUMENTS

| | | | | |
|---|---|---|---|---|
| 5,543,817 A * | 8/1996 | Inoue et al. | 345/100 |
| 5,754,161 A * | 5/1998 | Noguchi et al. | 345/684 |
| 6,801,219 B2 * | 10/2004 | Colavin | 345/684 |
| 7,170,518 B1 * | 1/2007 | Millington et al. | 345/428 |
| 7,313,764 B1 * | 12/2007 | Brunner et al. | 715/784 |
| 7,594,168 B2 * | 9/2009 | Rempell | 715/234 |
| 7,765,461 B2 * | 7/2010 | Suzuki et al. | 715/200 |
| 2006/0156375 A1 * | 7/2006 | Konetski | 725/135 |
| 2006/0256130 A1 * | 11/2006 | Gonzalez | 345/619 |
| 2007/0252834 A1 * | 11/2007 | Fay | 345/428 |

OTHER PUBLICATIONS

Satoshi Asami et al., "GridPix—Presenting Large Image Files Over the Internet", May 2000, Computer Science Division (EECS), University of California, Berkley, Report No. UCB/CSD-00-1099, 11 pages.

* cited by examiner

*Primary Examiner* — Daniel Hajnik
(74) *Attorney, Agent, or Firm* — Fish & Richardson P.C.

(57) ABSTRACT

Methods, systems, and apparatus, including computer program products, for incrementally updating the rendering of an artwork. In one aspect, a method includes first drawing a first portion of an artwork in a view, accepting input to draw a second portion of the artwork in the view, the second portion including a first region and a second region, stopping the first drawing before completion at a first level of completion, second drawing the second region in the view until progress of the second drawing reaches a second level of completion that is approximately the same as the first level of completion, joining the first region and the second region into a third region, and third drawing the third region in the view where the third drawing resumes drawing of the first and second regions at their respective levels of completion.

36 Claims, 8 Drawing Sheets

INCREMENTAL UPDATE OF COMPLEX ARTWORK RENDERING

BACKGROUND

Some applications display an image or artwork to a user in a graphical user interface (GUI). Some GUIs include a scrolling view which allows a user to change the view of the artwork displayed from one portion to another portion or to zoom in on or zoom out off a portion of the artwork. Applications can update the portion of artwork rendered in a view in response to user actions which change the view of the artwork to be displayed.

In some implementations, artwork is displayed in a resource-constrained environment. For example, a portable device (e.g., a mobile telephone or a personal digital assistant (PDA)) may have less processing power or memory to render a piece of artwork than a personal computer. For a user viewing artwork on a resource-constrained device, the artwork can be too complex to be completely rendered in the small amount of time between user actions, such as scrolling or panning the view of the artwork. As an example, while a small portion of a subway map is being rendered on a portable device, the user may scroll the view, resulting in a new, unpainted region appearing in the view before the completion of the earlier rendering.

The rendering of artwork can be updated in several ways. An earlier partial rendering of artwork can be erased, by a user scrolling in a GUI window, for example, and a new view can be rendered from the beginning. However, if the new view includes a region of the prior view, the elements of the region which were already rendered in the prior view are typically redrawn. Additionally, this can lead to a noticeable and undesirable "flicker" when a common region disappears and then reappears with the new region partially or completely rendered. Alternatively, the earlier rendering can be completed before the new, unpainted region is rendered. This requires the user to wait longer before seeing anything in the new region which, presumably, is the region of greatest interest to the user, because the user's last action was to scroll the view to include the new region.

SUMMARY

This specification describes technologies relating to incremental updating of complex artwork rendering.

Systems, methods, and apparatus including computer program products for incrementally updating the rendering of an artwork are described. In general, in one aspect, a computer-implemented method, a computer program product, and a system, respectively, are provided. The computer-implemented method, computer program product, and system include first drawing a first portion of an artwork in a view, before completion of the first drawing, accepting input to draw a second portion of the artwork in the view, the second portion including a first region and a second region, the first region being part of the first portion of the artwork in the view, the second region being adjacent to the first portion of the artwork, in response to the input, stopping the first drawing before completion at a first level of completion, second drawing the second region in the view until progress of the second drawing reaches a second level of completion that is approximately the same as the first level of completion, joining the first region and the second region into a third region, and third drawing the third region in the view where the third drawing resumes drawing of the first and second regions at their respective levels of completion.

Implementations can include one or more of the following features. The first region drawn during the first drawing can be retained and not erased. Drawing can be performed by a single drawing thread. Only one drawing thread can be active at a time. The artwork can include a plurality of elements, where each element has a sequential position in a drawing sequence. A level of completion can be relative to the number of elements in the drawing sequence which have been drawn. The computer-implemented method, computer program product, and system can further include maintaining a list of indicators for the level of completion of regions of the artwork. The input can correspond to scrolling the view of the artwork in a display.

In general, in one aspect, the computer-implemented method, computer program product, and system include first drawing a first portion of an artwork in a view, the first portion having a first size and a first zoom level in the view, before completion of the first drawing, accepting input to draw a second portion of the artwork in the view, the second portion included within the first portion, the second portion having a second size and the first zoom level in the view, the second size being smaller than the first size, the second portion including a first region and a second region, in response to the input, stopping the first drawing before completion, the first region being at a first level of completion, the second region being at a second level of completion, the first level of completion being a higher level of completion than the second level of completion, second drawing the second region at a second zoom level in the view until progress of the second drawing reaches a third level of completion that is approximately the same as the first level of completion, the second zoom level being higher than the first zoom level, joining the first region and the second region into a third region; and third drawing the third region in the view where the third drawing resumes drawing of the first and second regions at their respective levels of completion, the third region having the first size and the second zoom level in the view.

Implementations can include the following feature. The computer-implemented method, computer program product, and system can further include presenting a sampled version of the second portion of the artwork in the view, the second portion having the first size and sampled at the second zoom level in the view, the first region and the second region increased in size in the view proportionate to the increase in size from the second size to the first size, the first region being at the first level of completion, the second region being at the second level of completion.

In general, in one aspect, the computer-implemented method, computer program product, and system include first drawing a first portion of an artwork in a view, the first portion having a size and a first zoom level in the view, before completion of the first drawing, accepting input to draw a second portion of the artwork in the view, the first portion included within the second portion, the second portion including a first region and a second region, the first region being the first portion, the second region being adjacent to the first portion of the artwork, in response to the input, stopping the first drawing before completion, the first region being at a first level of completion, second drawing the second region at a second zoom level in the view until progress of the second drawing reaches a second level of completion that is approximately the same as the first level of completion, the second zoom level being lower than the first zoom level, joining the first region and the second region into a third region, and third drawing the third region in the view where the third drawing resumes drawing of the first and second regions at their respective levels of completion, the third region having the same size and the second zoom level in the view.

Implementations can include the following feature. The computer-implemented method, computer program product, and system can further include presenting a sampled version of the second portion of the artwork in the view, the second portion having the same size and sampled at the second zoom level in the view, the first region decreased in size in the view, the first region being at the first level of completion.

Particular embodiments of the subject matter described in this specification can be implemented to realize one or more of the following advantages. A partially rendered region of artwork is not updated until the current drawing operation has reached a rendering completion level equal to or approximately equal to the partially rendered region. The partially rendered region is not unnecessarily erased and redrawn. Incremental updates to the view of the most recently exposed region of artwork provide feedback to the user, indicating that the rendering operation is progressing. Periodic, incremental rendering updates of a complex piece of artwork using a single drawing thread conserves resources in a resource-constrained environment. A list of key-value pairs can be used to indicate the level of completion of rendering for each area of the artwork displayed in a view.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A portion of a complex piece of artwork can be rendered in a display or a view (e.g., a window) in a GUI where the user is capable of changing the portion of the artwork displayed in the view, e.g., by panning or scrolling the view. If a user is viewing the complex piece of artwork on a resource-constrained device, it is possible that the user may scroll the view too quickly or in many different directions, preventing the application from completely rendering the newly exposed regions of the artwork in the view between pan events or scrolls. Different techniques can be used for managing updates to the view, where the view functions as an aperture to the artwork defining the subset of the artwork displayed to a user.

Figure 1A:
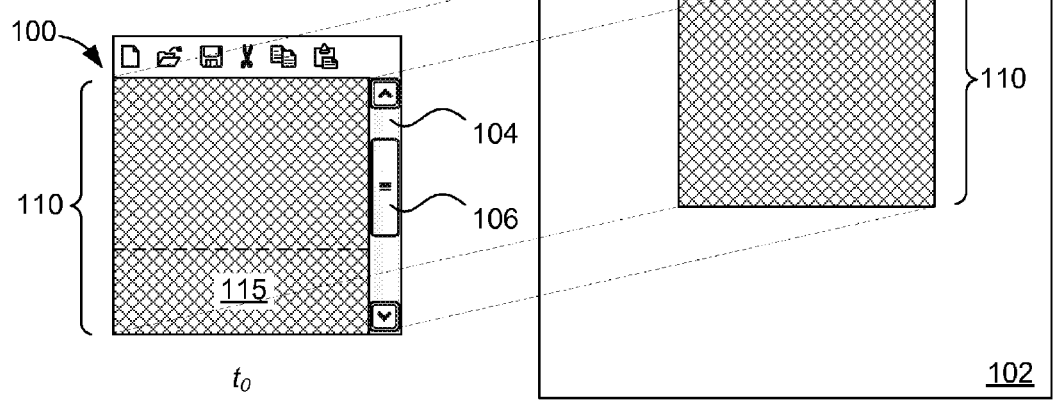
FIGS. 1A-1D illustrate a scrolling view of artwork and examples of rendering updates of the artwork in the prior art.
Figure 1A:
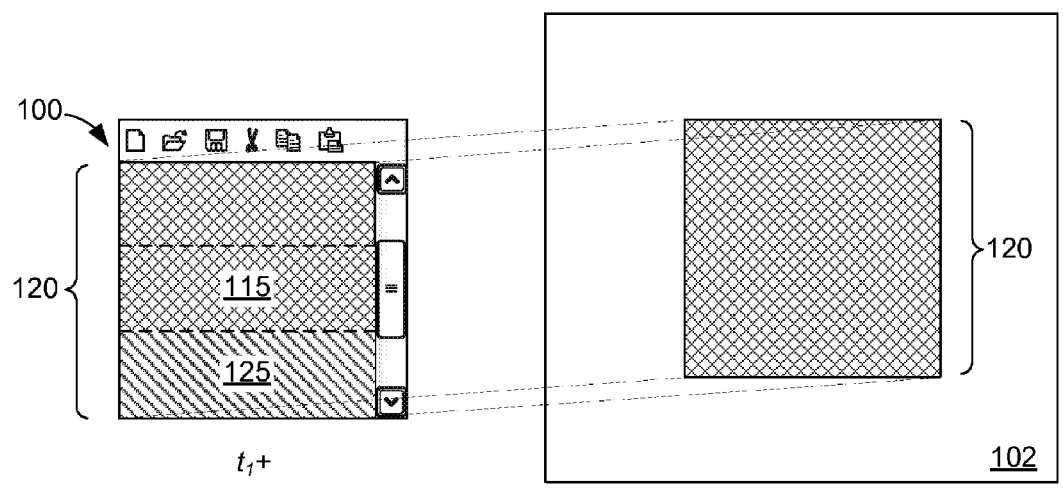
Figure 1A:
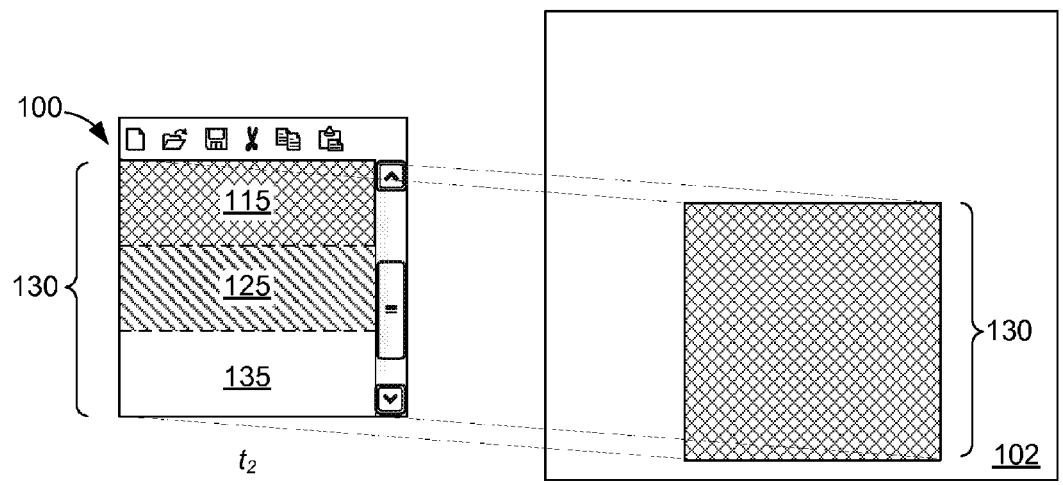

As shown in FIG. 1A, a prior art scrolling view 100 of artwork can be used to display portions 110, 120, 130 of a piece of artwork 102. The scrolling view 100 can be part of the GUI of an application program running on a user device. A user can scroll the view 100 horizontally or vertically to see different portions of the artwork 102.

The complex artwork can be stored, for example, as an electronic document. An electronic document does not necessarily correspond to a file. A document may be stored in a portion of a file that holds other documents, in a single file dedicated to the document in question, or in multiple coordinated files. A document can be stored in memory without first being stored in a file.

The artwork 102 can include multiple elements. The elements can be defined by mathematical constructs, as vector graphics objects, or as raster graphics objects or effects. In some implementations, an artwork tree represents all of the elements in an artwork, where the elements are the leaves of the tree. Alternatively, the elements of an artwork can be distributed between multiple artwork trees, where each tree represents, for example, a layer of the artwork. In some implementations, a piece of artwork has multiple artwork trees, where each tree is associated with a different region of the artwork.

For a piece of artwork having multiple elements, the artwork can be rendered in a view or a display according to a rendering or drawing sequence. For example, each element of an artwork can have a sequential position in the drawing sequence. The sequential position of an element determines the order in which the element will be drawn. A region of an artwork can have all the elements or a subset of the elements of the artwork. A region of an artwork can have an entire element or a portion of an element. A region which contains only a subset of the elements in the artwork can be rendered according to the drawing sequence for the entire artwork. When the region is rendered in a view according to the drawing sequence, the elements which are not a part of the region in the artwork are skipped, while the elements which are a part of the region in the artwork are drawn in the view in the order of their sequential position in the sequence.

Rendering a region up through a particular sequential position in the sequence does not necessarily mean that all of the artwork elements with earlier sequential positions are drawn in that region in a view. Rendering a region up through a particular sequential position means that the region in the view has been rendered with all the elements in that region of the artwork with sequential positions which are less than or equal to the particular sequential position. For example, a piece of artwork might have 100 elements, but a region of the artwork may only have four elements with sequential positions of 2, 5, 20, and 43. If the region is rendered in a view up through sequential position 30, three of the four elements (i.e., the elements at positions 2, 5, and 20) have been drawn, while the fourth element (i.e., the element at position 43) remains to be drawn.

Returning to the prior art example of FIG. 1A, a user can view a first portion 110 of the artwork 102 in a scrolling view 100. At time $t_0$, the first portion 110 of the artwork 102 displayed in the view 100 is completely rendered. That is, all the elements of the portion 110 of the artwork 102 have been drawn in the view 100, e.g., in the order of the sequential positions of the included elements.

At time $t_1$, the user scrolls the view 100 to display a second portion 120 of the artwork 102. In some implementations, the user scrolls the view 100 by selecting and dragging a slider 106 in a scrollbar 104 of the GUI using an input device, such as a stylus, a touchpad, a pointing stick, or a keypad. However, other means for scrolling are possible. The second portion 120 includes a region of the first portion 110 (including region 115) and a new region 125 of the artwork 102 which is not part of the first portion 110. At some time $t_1+$ after $t_1$, an application can update the view 100 by rendering the elements in the newly exposed region 125 in response to receiving the input from the user to change the view.

In some implementations, an image or artwork can be rendered by initiating a drawing thread or drawing process. Multiple drawing threads can execute simultaneously, where each drawing thread renders a region of the artwork. However, in a resource-constrained environment, having multiple drawing threads active at one time can quickly strain limited resources. Even in an environment that has sufficient resources to support multiple simultaneous rendering threads, it can be challenging for the rendering operation to keep pace with a user who scrolls in different directions multiple times in quick succession, generating several new update regions with different levels of rendering completion.

In some implementations, the view is updated by first rendering elements in an off-screen buffer and then copying partially rendered or completely rendered regions to the view or a display. In some implementations, multiple buffers are used during rendering. For example, elements can be directly rendered in a first buffer, the contents or a subset of the contents of the first buffer can be copied to a second buffer, and the contents or a subset of the contents of the second buffer can be copied to a view or display of a user device.

At time $t_2$, before the application has completely rendered region 125, the user scrolls the view 100 a second time, displaying a third portion 130 of the artwork 102. The third portion 130 includes a completely rendered region 115 of the first portion 110 and the second portion 120, the partially rendered region 125 of the second portion 120, and a new region 135 of the artwork 102. The newly exposed region 135 is not a part of either the first portion 110 or the second portion 120. At time $t_2$, the application has not rendered any elements included in the region 135 of the artwork 102. An update of the view 100 immediately after the second scroll might display the newly exposed region 135 as a blank region.

Figure 1B:
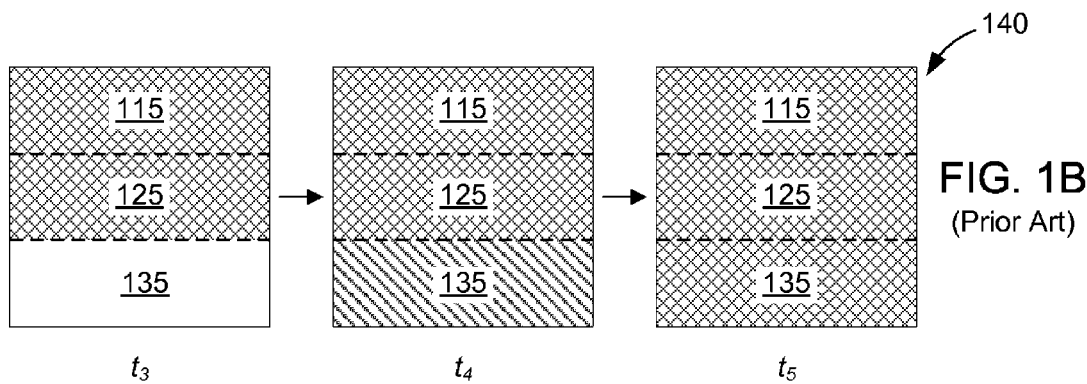
Figure 1C:
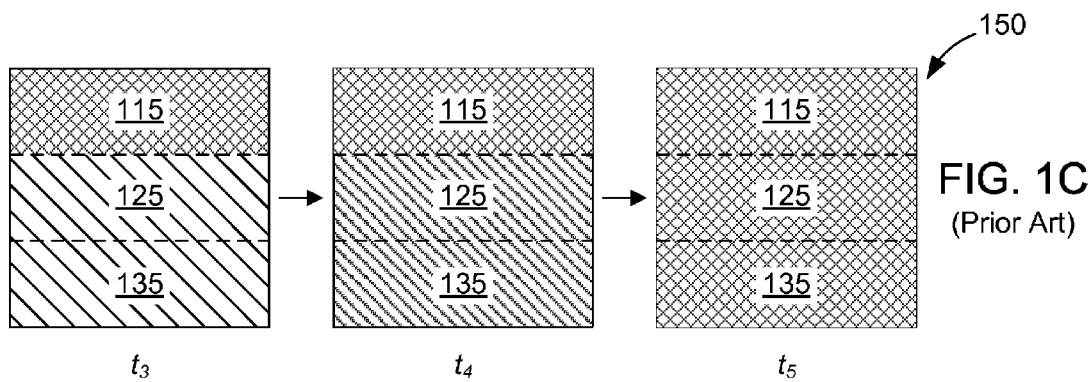
Figure 1D:
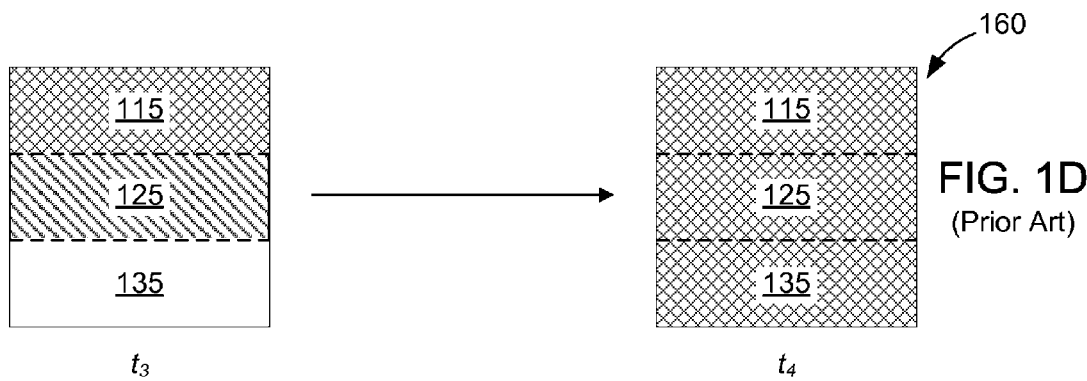

FIGS. 1B-1D illustrate prior art examples of rendering updates of the artwork in some implementations. FIG. 1B illustrates a prior art example of updating the rendering of the view by completing the drawing of the partially rendered region 125 before beginning to render any elements in the newly exposed region 135. Between time $t_2$ and a time $t_3$, the application updates the region 125 (of FIG. 1A) by rendering in the view the remaining elements included in the region 125 of the artwork 102. This region is updated as region 125 in FIG. 1B. At time $t_3$, the application has not updated the newly exposed region 135 and it remains blank in the view. At time $t_4$, after completely rendering region 125, the application updates the region 135 by rendering in the view some fraction of the elements included in the region 135 of the artwork 102. This region is updated as region 135. Finally, at time $t_5$, the application completes the rendering of the third portion 130 in the view by updating the view with the completely rendered region 135. In some implementations, the middle step is skipped and the region 135 is updated in the view directly as region 135.

A disadvantage of this method of incremental updates is that the user may have to wait a long time before seeing anything in the newest exposed region, especially in a resource-constrained environment. This can be frustrating to the user who is likely especially interested in the newest region of the artwork, because the user's most recent action was to change the view to include this region.

FIG. 1C illustrates a second example of prior art updating the rendering of a view. This example uses a method that restarts the rendering and provides incremental updates for all incompletely rendered regions in the view. However, because the rendering of partially rendered region 125 is restarted, it is possible that an incremental update to region 125 will have fewer elements rendered than the number of elements rendered in region 125 at time $t_2$ (of FIG. 1A). That is, if the restarted rendering has not progressed beyond the level of completion of the partially rendered region 125 at time $t_2$, some of the elements of the region 125 of FIG. 1A will appear to have been erased when the region 125 is incrementally updated. This occurs at time $t_3$, when regions 125, 135 of the view are incrementally updated. Although region 135 has more elements rendered at time $t_3$ than at time $t_2$, region 125 has fewer elements rendered at time $t_3$ than at time $t_2$. At time $t_4$, the view is incrementally updated with further rendered regions 125, 135. Finally at time $t_5$, the view is updated with completely rendered regions 125, 135. Note that the partially rendered region 125 of FIG. 1C at time $t_4$ is not necessarily rendered to the same level of completion as the partially rendered region 125 of FIG. 1A at time $t_2$. That is, the update at time $t_4$ of the region 125 may have a different number of elements rendered (i.e., may be earlier or later in the drawing sequence) than the region 125 at time $t_2$.

A disadvantage of this approach to incremental updates is that some of the elements of partially rendered region 125 of FIG. 1A are erased and redrawn which unnecessarily wastes resources, both in the erasing and in the redrawing. The consecutive displays of a region that is first partially rendered, then less rendered, and then further rendered can create a noticeable and undesirable "flicker" for the user.

FIG. 1D illustrates a third prior art example of updating the rendering of a view. This example is similar to the example of FIG. 1C in that the rendering of incomplete regions is restarted, except that there are no incremental updates between displaying in the view the incomplete regions 125, 135 at time $t_2$ of FIG. 1A and displaying in the view the completely rendered regions 125, 135 at time $t_4$. That is, at intermediate time $t_3$, the view displays regions 115, 125, 135 at the same levels of completion as the levels of completion of the regions at time $t_2$ of FIG. 1A. For a complex piece of artwork rendered in a resource-constrained environment, the user may have to wait a non-trivial amount of time before viewing the completed regions. Without receiving incremental updates as feedback, users may become annoyed or frustrated, thinking that the rendering process has stalled when, in actuality, it is still rendering the newly exposed regions in an off-screen buffer.

Figure 2:
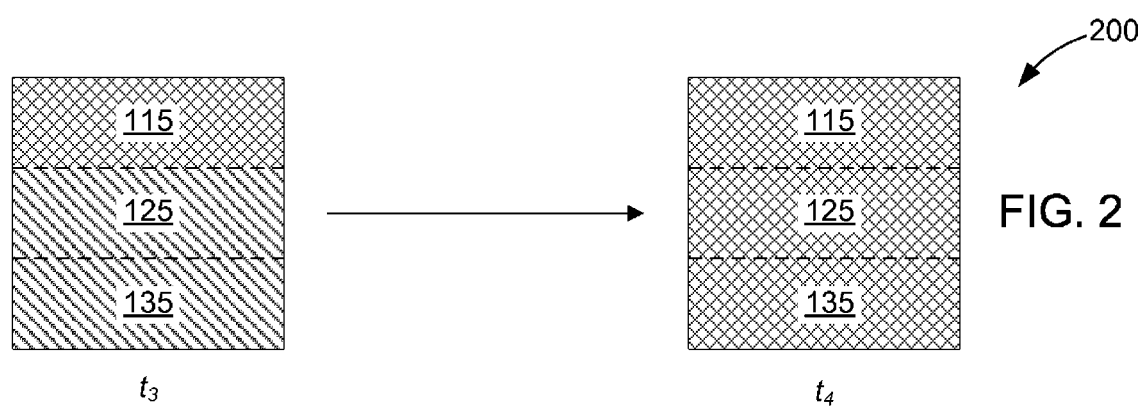
FIG. 2 is an example of incremental rendering updates of artwork.

FIG. 2 is an example of incremental rendering updates of artwork which renders newly exposed regions first without unnecessary redraw of partially rendered regions. Unlike the approaches of FIGS. 1B-1D, after time $t_2$, the method of FIG. 2 renders in part the blank region 135 (of FIG. 1A) first before returning to the partially rendered region 125. At time $t_3$, the blank region 135 is updated with the partially rendered region 135. The elements that were already rendered in region 125 are not erased and redrawn. This avoids creating an undesirable "flicker" in region 125. At time $t_3$, the partially rendered region 135 is at a level of completion that is approximately the same as the level of completion of partially rendered region 125. In some implementations, the levels of completion of the two regions are the same. The level of completion will be explained in more detail below. Between time $t_3$ and time $t_4$, the rendering of regions 125, 135 complete and, at time $t_4$, the view is updated with the completely rendered regions 125, 135.

In addition to avoiding "flicker" and unnecessary redraw, the method illustrated in FIG. 2 has the advantage of giving the user incremental feedback in the rendering of the newly exposed region first. As described above, the user is likely more interested in this newly exposed region than in the other regions, because the last action (e.g., scrolling the view) of the user was to expose this newest exposed region of the artwork.

In the examples of FIGS. 1B-1D and FIG. 2, the timing of the updates (i.e., at times $t_3$ through $t_5$) are for illustrative purposes and are not necessarily the same across the examples. Additionally, the incremental updates illustrated in the examples are not necessarily the updates that would occur in a particular implementations. In some implementations, the time interval between updates to the view is constant, e.g., once every half second. In some implementations, updates to the view occur at regular intervals in the drawing sequence or at regular intervals in the portion or percentage of elements rendered, e.g., updates occurring after an additional 25% of the elements are drawn.

Figure 3A:
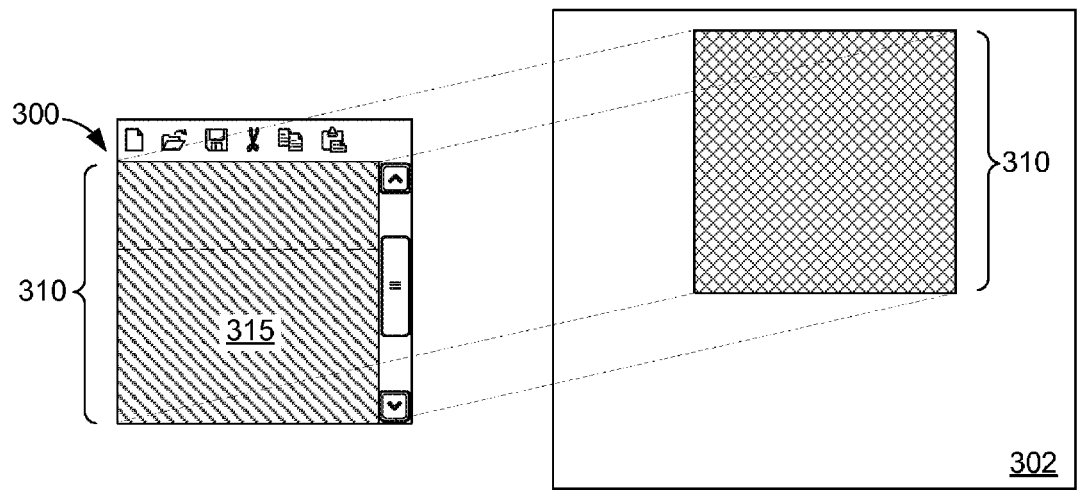
FIGS. 3A-3B illustrate a scrolling view of artwork and incremental rendering updates of the artwork.
Figure 3B:
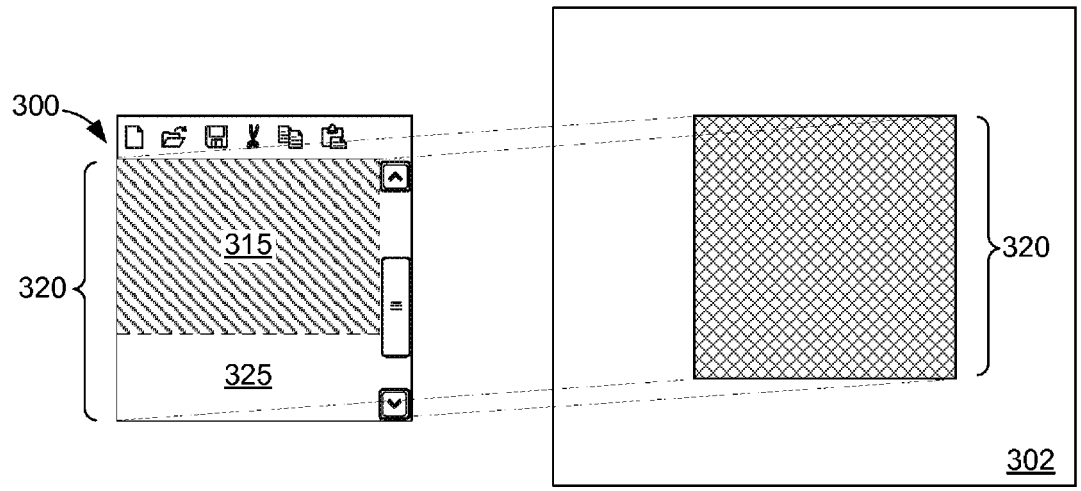
Figure 3B:
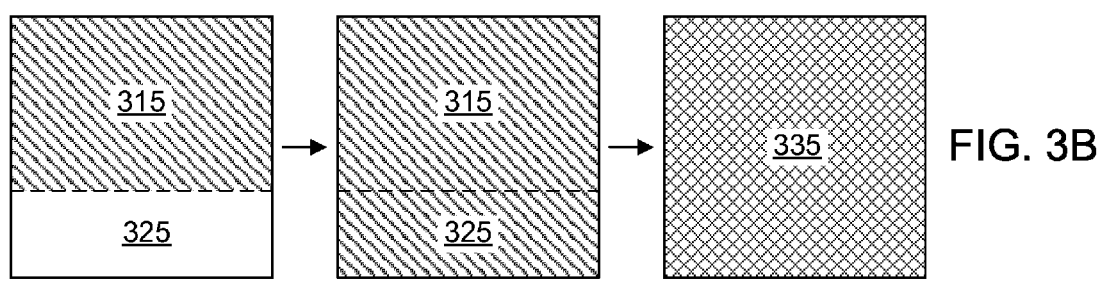
Figure 4:
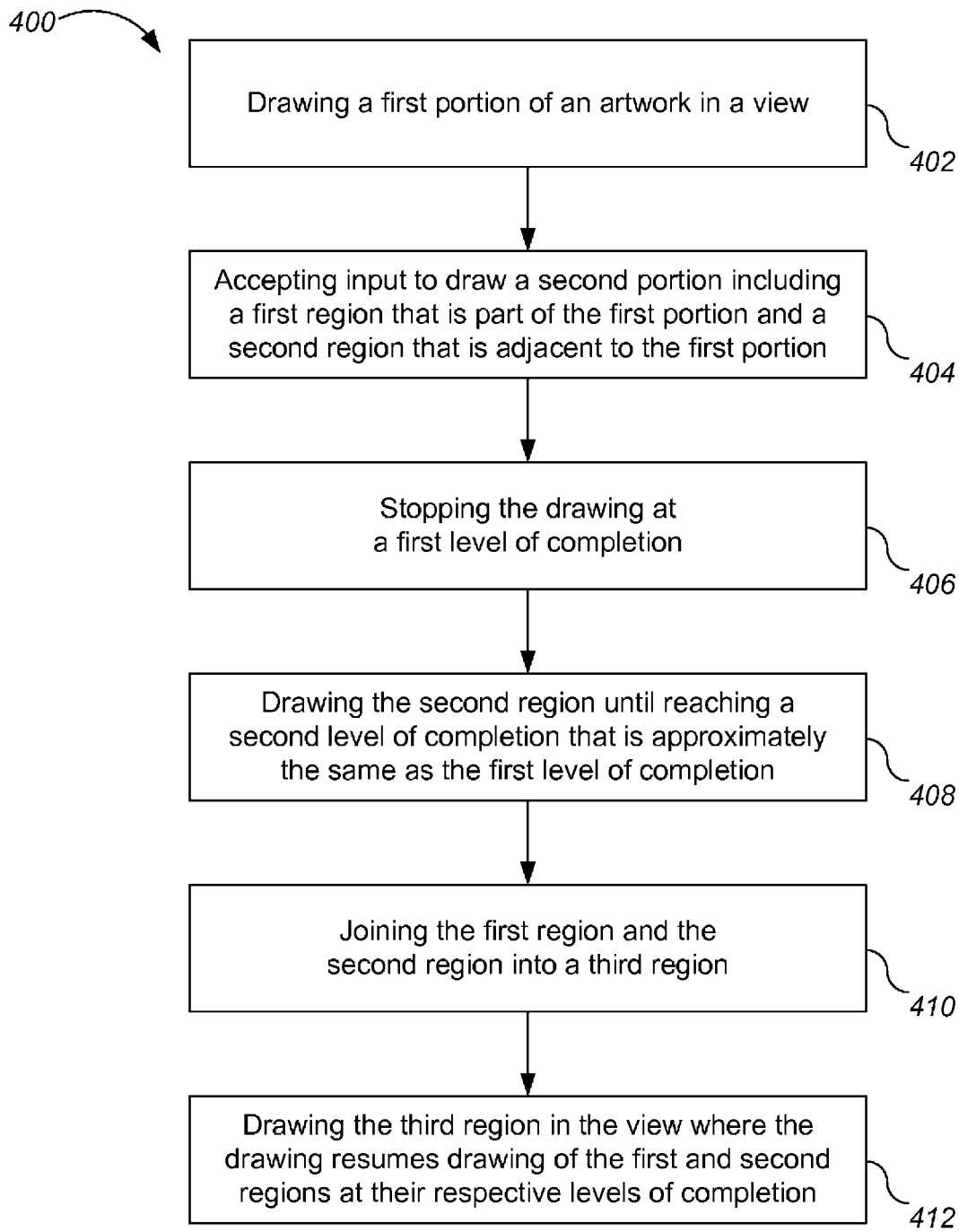
FIG. 4 is a flow diagram illustrating a method of incrementally updating the rendering of a piece of artwork.

FIGS. 3A-3B illustrate a scrolling view 300 of a piece of artwork 302 and incremental rendering updates of the artwork 302 in the view 300. FIG. 3A illustrates the scrolling view 300 before and after accepting input to change the view from a first portion 310 to a second portion 320 of the artwork 302. FIG. 3B illustrates the view 300 of the second portion 320 immediately after accepting input, after an incremental rendering update, and after a final update to produce a completely rendered view. FIG. 4 is a flow diagram illustrating a method 400 of incrementally updating the rendering of artwork in a view. The description of the method 400 will be referenced to the example of FIGS. 3A-3B.

Step 402 of method 400 first draws a first portion 310 of an artwork 302 in a view 300. In the example of FIGS. 3A-3B, the first portion 310 of the artwork 302 is displayed in the scrolling view 300. The first drawing can be initiated by a first drawing thread or draw process.

Before completion of the first drawing, Step 404 of method 400 accepts input to draw a second portion 320 of the artwork 302 in the view 300. The second portion 320 includes a first region 315 and a second region 325. The first region 315 is part of the first portion 310 in the view 300. The second region 325 is not a part of the first portion 310 but is, instead, adjacent to the first portion 310 of the artwork 302. In some implementations, the input is received as user input panning or scrolling the view 300 using an input device, e.g., a keypad or a stylus.

In response to the input to change the view, Step 406 of method 400 stops the first drawing before completion, where the drawing is stopped at a first level of completion. That is, the first portion 310 drawn in the view 300 is only partially rendered when input is received to change the view to the second portion 320 of the artwork 302. The first drawing thread initiated to render the first portion 310 in the view 300 is terminated or paused. The level of completion can be relative to the drawing sequence. There can be a deterministic mapping from the artwork elements to a monotonically increasing sequence. In some implementations, the level of completion can indicate the sequential position in the drawing sequence of the most recently drawn element. For example, the first level of completion can be an integer specifying the sequential position of the last element drawn before the first drawing was terminated or paused. In some circumstances, the first portion 310 has several regions at different levels of completion, where the number of regions at different levels is a function of the pattern of user scroll-gestures and the amount of drawing that completes between these gestures. FIG. 3B illustrates the view 300 of the second portion 320 after accepting the input and stopping the first drawing. The first region 315 is partially rendered while the newly exposed second region 325 is blank.

Step 408 of method 400 second draws the second region 325 in the view 300 until the progress of the second drawing reaches a second level of completion. The second drawing can be initiated by a second drawing thread. Because the first drawing thread was stopped before initiating the second drawing thread, only one drawing thread is active at a time. This reduces the strain on resources when rendering in a resource-constrained environment. The second level of completion is approximately the same as the first level of completion. For example, if the level of completion for a region indicates the percentage drawn in the view of the region's elements in the artwork, two regions with different levels of completion (i.e., different percentages of their elements drawn in the view) can be rendered together using the same drawing thread if the renderings of the two regions are at the same point in the drawing sequence. FIG. 3B illustrates the view 300 of the second portion 320 after the view 300 has been incrementally updated with the second region 325. The partially rendered second region 325 replaces the blank second region 325 in the view 300. The partially rendered first and second regions 315, 325, respectively, are at approximately the same level of completion. In some implementations, the regions 315, 325 are at the same level of completion.

In some implementations, a region of the artwork is first rendered in a buffer before copying some or all the contents of the buffer to the view as an update to the view. The elements of the artwork can be rendered in the view in accordance with the sequential positions of the elements in the drawing sequence. For example, the second region 325 can be rendered in an off-screen buffer by drawing the elements of the region in the artwork in the order of the drawing sequence. When the rendering in the off-screen buffer reaches the second level of completion, the partially rendered second region can be copied from the buffer to the view to update the view as the second region 325.

In some implementations, the entire portion of the artwork to be displayed in the view is rendered in an off-screen buffer. For example, even though the first region 315 of the first portion 320 is partially rendered in the view, the entire portion 320 is rendered using one drawing thread in a buffer. When the view is updated, only the partially rendered second region 325 is copied from the buffer to the view. Although the first region 315 is also partially rendered in the buffer, the first region of the view does not need to be updated, because the rendering of the first region in the buffer is not further in the rendering process than the rendering of the first region in the view.

In some implementations, a list of indicators or a lookup table is maintained to indicate the level of rendering completion of regions of the artwork. A lookup table can map drawing sequence elements to regions of the artwork. In some implementations, a list of key-value pairs is maintained (e.g., as a data structure) and used to indicate the level of completion of rendering for each region of the artwork displayed in a view. This key-value pair list can be used to determine which regions of a view should be updated with regions rendered in a buffer. A key-value pair includes a key and a corresponding value. A key can indicate the sequential position of an element in the drawing sequence. A value can indicate a region of the artwork in the view which has been drawn with only the elements having sequential positions that are less than or equal to the sequential position represented by the corresponding key.

In some implementations, the value corresponds to a region that is mathematically defined by a Boolean-valued function over a coordinate plane of pixels. For example, for a view with a dimension of n×m pixels and a key-value pair of <25, R25>, the value R25 can be an n×m coordinate plane of pixels. Each of the n×m pixel entries of R25 can have a value of 0 or 1. The pixels with R25 values equal to 1 indicate the regions of the view which have been rendered with elements with sequential positions that are less than or equal to 25 (i.e., the corresponding key). The pixels with R25 values equal to 0 represent regions of the view which have been rendered through a level of completion other than the level represented by the corresponding key.

In some implementations, maintaining the key-value pair list includes deleting entries or determining new or modified entries for the key-value pair list after updating the view or after accepting input to draw a different portion of the artwork in the view. For example, if input is accepted to draw a different portion of the artwork which includes a new region not presently in the view, a new entry <0, new region> is created. If the key-value pair list already contains an entry for the key 0, because a region of the present view has not been rendered (i.e., the region is still blank in the view), the key-value pair for key 0 is modified by setting the corresponding value R0 to the union of the new region and the prior blank region. Before beginning to render a piece of artwork, the key-value pair list can be initialized with the pair <0, aperture region>, where the aperture region is the portion of the artwork to be rendered in the view. For example, in a GUI, the aperture region can be the rectangular-shaped subset of the artwork to be rendered in a scrolling view. Returning to method 400, Step 410 joins the first region 315 and the second region 325 into a third region. For example, if the first level of completion is equal to the second level of completion, the key for that common level of completion is mapped to the third region, which is the union of the first region 315 and the second region 325.

Step 412 of method 400 third draws the third region in the view 300, where the third drawing resumes drawing of the first region 315 and the second region 325 at their respective levels of completion. FIG. 3B illustrates the view 300 of the second portion 320 after the view 300 has received a final update. The view 300 displays the completely rendered third region 335 after the final rendering of the joined partially drawn first and second regions 315, 325.

Figure 5A:
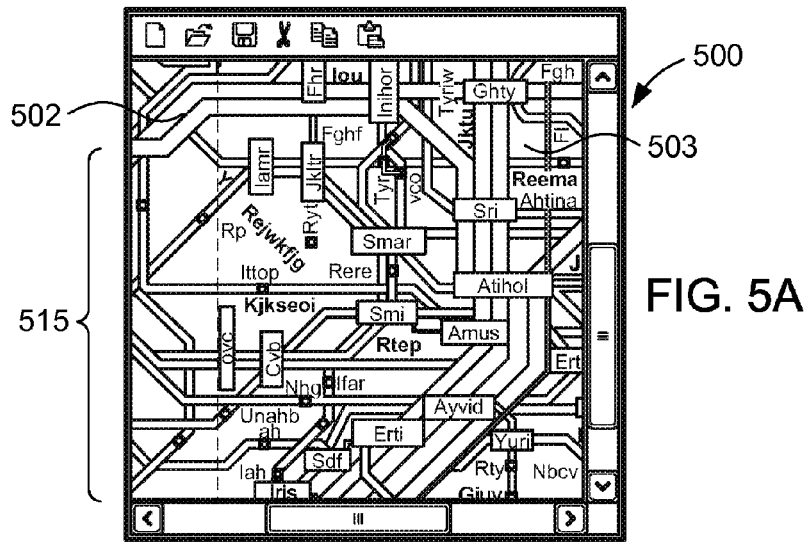
FIGS. 5A-5C illustrate a scrolling view of complex artwork and an incremental rendering update of the complex artwork.
Figure 5B:
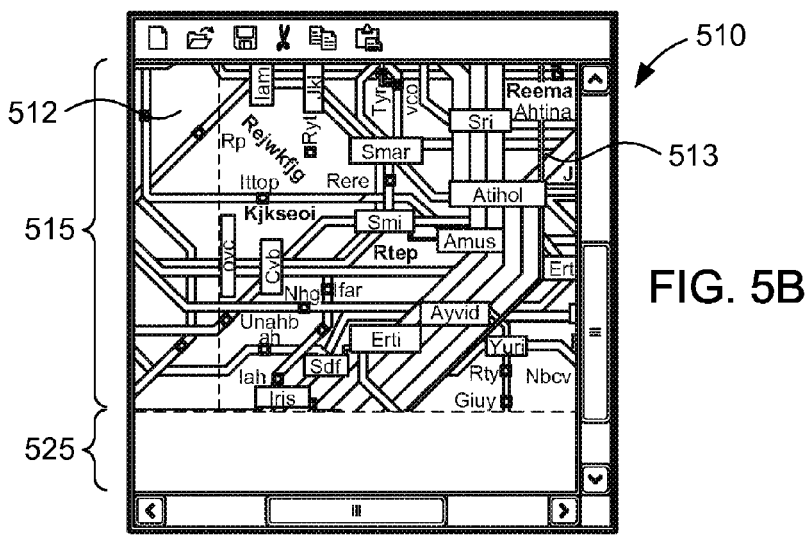
Figure 5C:
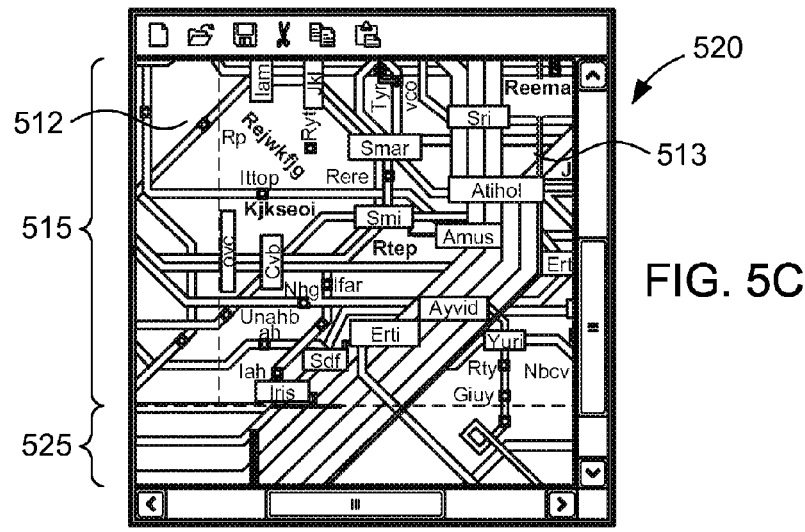

FIGS. 5A-5C illustrate a scrolling view of a complex piece of artwork and an incremental rendering update of the complex artwork. The example illustrates implementing the method 400 in FIG. 4 to incrementally update the rendering of a complex map of a subway system. For this example, the user is viewing a subregion of the subway map on the small screen of a resource-constrained device, such as a mobile device. The user has zoomed in on a portion of the complex subway map and scrolls several times before the rendering can be completed.

The complex subway map has several different kinds of elements including subway lines, unboxed text, and boxed text. For this example, the drawing sequence is defined in that order, i.e., subway lines are drawn first, then the unboxed text, and finally the boxed text. The drawing sequence can be defined by the z-order of the elements, where the z-order specifies the stacking order of elements in an artwork tree. In some implementations, a single artwork tree has all the elements in the map. Each individual element, e.g., a particular subway line or a particular boxed text for a subway station, can have a separate sequential position in the drawing sequence for the map. In this simplified example, the subway map has 100 total elements which include 20 subway line elements, 50 unboxed text elements, and 30 boxed text elements. A complex artwork can have many more elements than this simplified example.

In some implementations, the different types of elements can be divided into different layers of the map, where each layer has an artwork tree (e.g., the boxed text artwork tree) and each artwork tree has individual elements of that particular type.

FIG. 5A illustrates the view 500 after the user has recently scrolled the view to the left. A region 503 on the right side of the view 500 is already completely rendered with all the elements in that part of the artwork. That is, the region 503 is completely rendered in the view 500 with all the subway lines, unboxed text, and boxed text that are in the corresponding region of the artwork. This region would appear in the key-value pair list as <100, region 503>. The partially rendered region 502 on the left side of the view 500 has been rendered (e.g., by a drawing thread) through the 20 subway line elements but none of the unboxed or boxed text elements. Rendering region 502 through sequential position 20 (representing the 20th subway line in the artwork) means that the drawing of the region 502 in the view 500 includes all the elements in that region of the artwork with sequential positions of 20 or less (i.e., the 20 subway line elements) in the drawing sequence. This region would appear in the key-value pair list as <20, region 502>. The key-value pair list for view 500 only has two pairs: <20, region 502> and <100, region 503>.

FIG. 5B illustrates a new view 510 which appears after the user has scrolled the view downward. The user input which indicates the downward scroll is received before the drawing of view 500 is completed. In response to the received input, the drawing in view 500 is terminated or paused at a first level of completion. The level of completion of the drawing is the lowest level of rendering of any region in the view 500. In this case, the first level of completion is associated with the region 502 which is partially rendered with only the subway line elements. Hence, the first level of completion can be indicated by the key 20, representing the rendering of the view 500 up through the element with a sequential position of 20. The portion of the artwork displayed in the view 510 encompasses both a region 515 of the artwork displayed in view 500 and a new region 525 of the artwork. The new region 525 is adjacent to the portion of the artwork displayed in view 500 and is initially blank in view 510, because it was not rendered and stored as part of a prior view. The region 515, which was part of view 500, includes region 512 and region 513 which are at different levels of completion. The region 512 is part of region 502 in FIG. 5A. Likewise, the region 513 is part of region 503 in FIG. 5A. The key-value pair list for view 510 is updated to include three pairs: <0, region 525>, <20, region 512>, and <100, region 513>.

The drawing operation is restarted, e.g., by initiating a new drawing thread, to render blank region 525. The rendering of this most recently exposed region 525 begins before any additional elements are rendered in the 515 region. The rendering of region 525 continues until that region reaches a second level of completion that is approximately the same as the first level of completion. In the example of FIGS. 5A-5C, the second level of completion is the same as the first level of completion (i.e., represented by sequential position 20 of 100 total elements).

FIG. 5C illustrates a new view 520 which has been updated with the partially rendered region 525. The region 525 is rendered to the same level of completion as the partially rendered region 512. Both regions have been rendered through all 20 of the subway line elements. However, none of the unboxed or boxed text elements of the artwork have been drawn in the region 525 of view 520.

A new L-shaped region is formed by the joining of region 525 and the region 512. The key-value pair list for view 520 is updated to include two pairs: <20, L-shaped union of region 525 and region 512> and <100, region 513>. The drawing process continues to render additional elements in this L-shaped region according to the sequential positions of the elements in the drawing sequence. In this example, the unboxed text elements would be added to the L-shaped region before the boxed text elements are added, according to the drawing sequence. In some implementations, the L-shaped region is updated in the view an additional two times: once after the unboxed text elements are rendered, and once after the boxed text elements are completely rendered. In some implementations, the view is updated with additional intermediate incremental updates. In some implementations, the view is not updated until the L-shaped region is completely rendered with the remaining elements.

The rendering operation illustrated in FIGS. 5A-5C can use an off-screen buffer. If the active drawing thread renders both region 515 and region 525, the key-value pair list can be used to determine which regions of the buffer should be "clipped" to the view during an update. The regions of the view which should be updated are the regions which are not "ahead" of the drawing thread in the buffer. With this update method, no "flicker" will occur, because the update is only clipped to the pixels in the view which are displaying elements with sequential positions that precede the current element position of the buffer rendering operation.

Consider when there is to be an update of the view when the drawing thread has progressed in the drawing sequence through the 20 subway line elements and the 50 unboxed text elements. At the time of the update, the sequential position in the drawing sequence of the most recently rendered element (i.e., element 70 in the sequence representing the last unboxed text element) can be identified.

Next, all keys in the key-value list representing sequential positions in the sequence which precede the identified sequential position are identified. For the set of two key-value pairs maintained for view 520, key 20 would be identified as the only key in the list representing a position in the sequence which precedes the identified position 70 of the most recently rendered element in the buffer.

The one or more identified keys are mapped to their corresponding values, and the values represent the regions of the view which should be updated by copying the corresponding rendered regions from the buffer. In the example, the identified key 20 can be mapped to the corresponding value which represents the region (i.e., the L-shaped union of region 525 and region 512) of the view 520 which should be updated with the corresponding further rendered region of the buffer. Note that the region 513 of the view 520 should not be updated because the buffer drawing thread has not "caught up" to the level of completeness of region 513. After the update, the key-value pair list would be updated to include the following two key-value pairs: <70, L-shaped union of region 525 and region 512> and <100, region 513>. A final update to the view would result in the single key-value pair <100, union of region 515 and region 525>. This technique can be generalized to any number of user actions, and there can be an arbitrary number of regions at different levels of completion.

In some implementations, instead of identifying keys that precede the identified sequential position of the most recently rendered element in the buffer, the keys that follow the identified sequential position are identified. These keys can then be mapped to their corresponding values which represent the regions of the view which should not be updated. That is, the identified keys can be used to form a mask for the view, and an update to the view would not occur in the masked regions.

Figure 6:
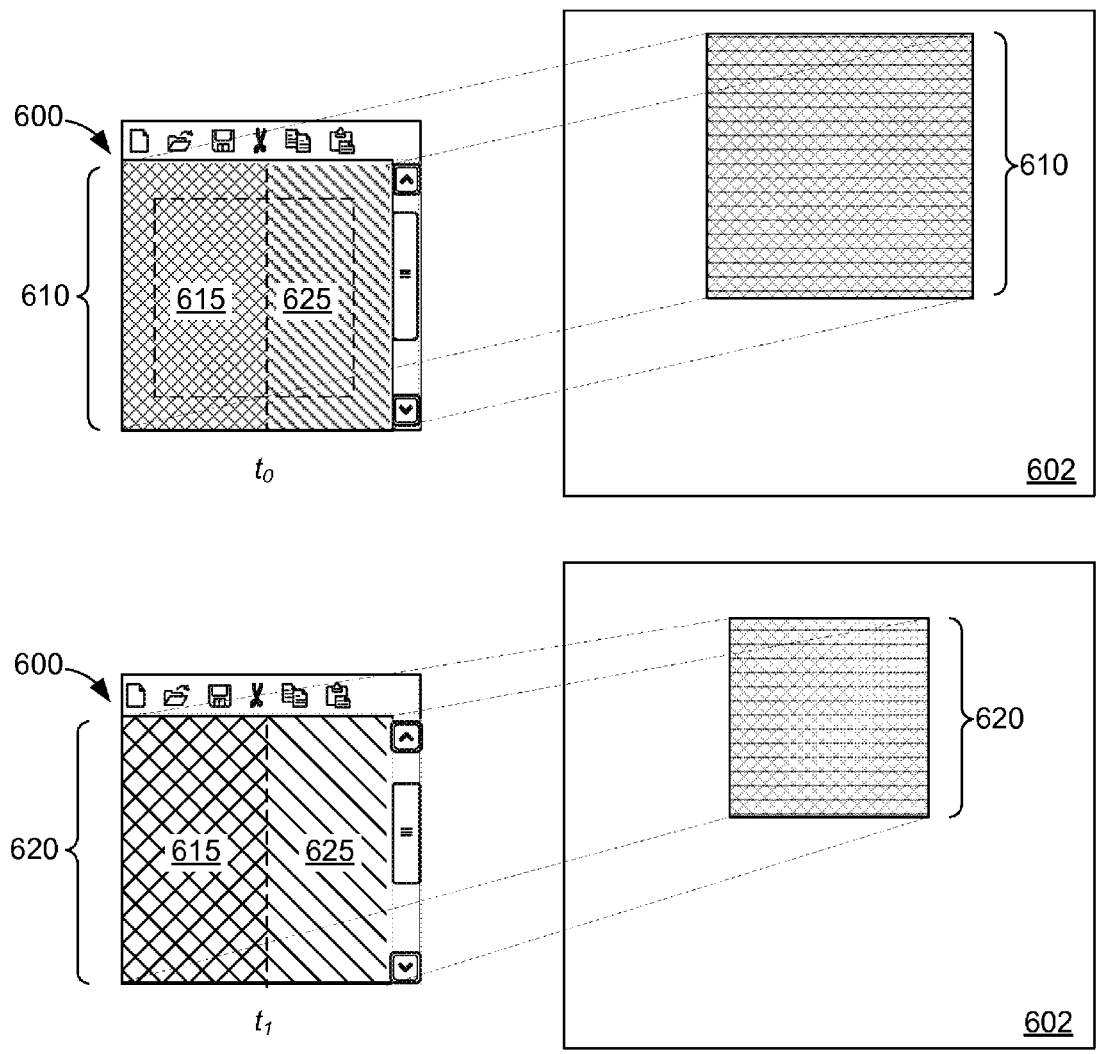
FIG. 6 illustrates zooming in on a portion of artwork in a view.

The technique for performing incremental updates of complex art rendering can be extended to cover instances when input is received to zoom in on or zoom out of a portion of artwork displayed in a view. This technique can be generalized to an arbitrary number of user actions changing the zoom level. FIG. 6 illustrates zooming in on a portion 610 of artwork 602 in a view 600. A first portion 610 of the artwork 602 drawn in the view 600 has a first size and a first zoom level in the view 600. In some implementations, a zoom level corresponds to the scale of the artwork displayed in the view, where the scale defines the ratio of a unit of length in artwork space to a unit of length in the view (e.g., the length of a pixel on a screen). At time $t_0$, before the drawing of the first portion 610 is completed, a user provides input to zoom in on the first portion 610 to a second portion 620 which intersects the first portion 610. In some circumstances, the second portion 620 is within the boundaries of the first portion 610. The input to draw the second portion 620 of the artwork 602 is accepted. The second portion 620 has a second size and the first zoom level in the view 600, where the second size is smaller than the first size.

In response to the input to zoom in on the first portion 610, the drawing of the first portion 610 is stopped before completion. The second portion 620 of the artwork 602 in the view 600 includes a first region 615 and a second region 625. When the drawing of the first portion 610 is stopped, the first region 615 is at a first level of completion, and the second region 625 is at a second level of completion. The first level of completion is a higher level of completion than the second level of completion. For example, the region 615 may be rendered to a higher element sequence position in the drawing sequence than the rendering of region 625.

After the drawing of portion 610 is halted, at time $t_1$, the second portion 620 of the artwork 602 is presented in the view 600. The second portion 620 in the view 600 now has the first size and a second zoom level in the view 600. For example, the second portion 620 can have a second scale in the view 600. In some implementations, the second zoom level is higher than the first zoom level. The first region 615 and the second region 625 are increased in size in the view 600 proportionate to the increase in size from the second size to the first size. The regions 615, 625 can be increased in size in the view 600 by sampling the artwork at the second zoom level (i.e., the second scale). At this point, the first region 615 is still at the first level of completion, and the second region 625 is still at the second level of completion. The sampling provides an approximation (e.g., a "chunkier" version) of a rendering of the region 620 at the second zoom level.

The drawing operation then begins to render the second region 625 at the second zoom level in the view 600. The second region 625 is partially rendered before continuing to render the sampled first region 615, because the rendering of the first region 615 is more complete than the rendering of the second region 625. The rendering of the second region 625 progresses until the rendering reaches a third level of completion. This third level of completion is approximately the same as the first level of completion. In some implementations, the third level of completion is equal to the first level of completion.

The first region is joined with the second region into a third region. When the drawing continues, the third region has the first size and is rendered at the second zoom level in the view 600. The drawing continues for the joined first and second regions at their respective levels of completion.

In some implementations, the rendering operation uses an off-screen buffer. Once the drawing thread at the first zoom level is terminated, a drawing thread for the entire second portion 620 can begin at the second zoom level in the buffer. When the drawing thread at the second zoom level reaches the second level of completion, the sampled second region 625 is updated to a rendering at the second zoom level by copying the corresponding region from the buffer. However, to avoid "flicker," the sampled further rendered first region 615 is not updated until the rendered second region 625 is approximately as far along in the drawing sequence at the second zoom level. When this occurs, the sampled first region 615 of the view 600 can be updated to the same first level of completion but at the second zoom level by copying the corresponding rendered region at the second zoom level from the buffer.

Figure 7:
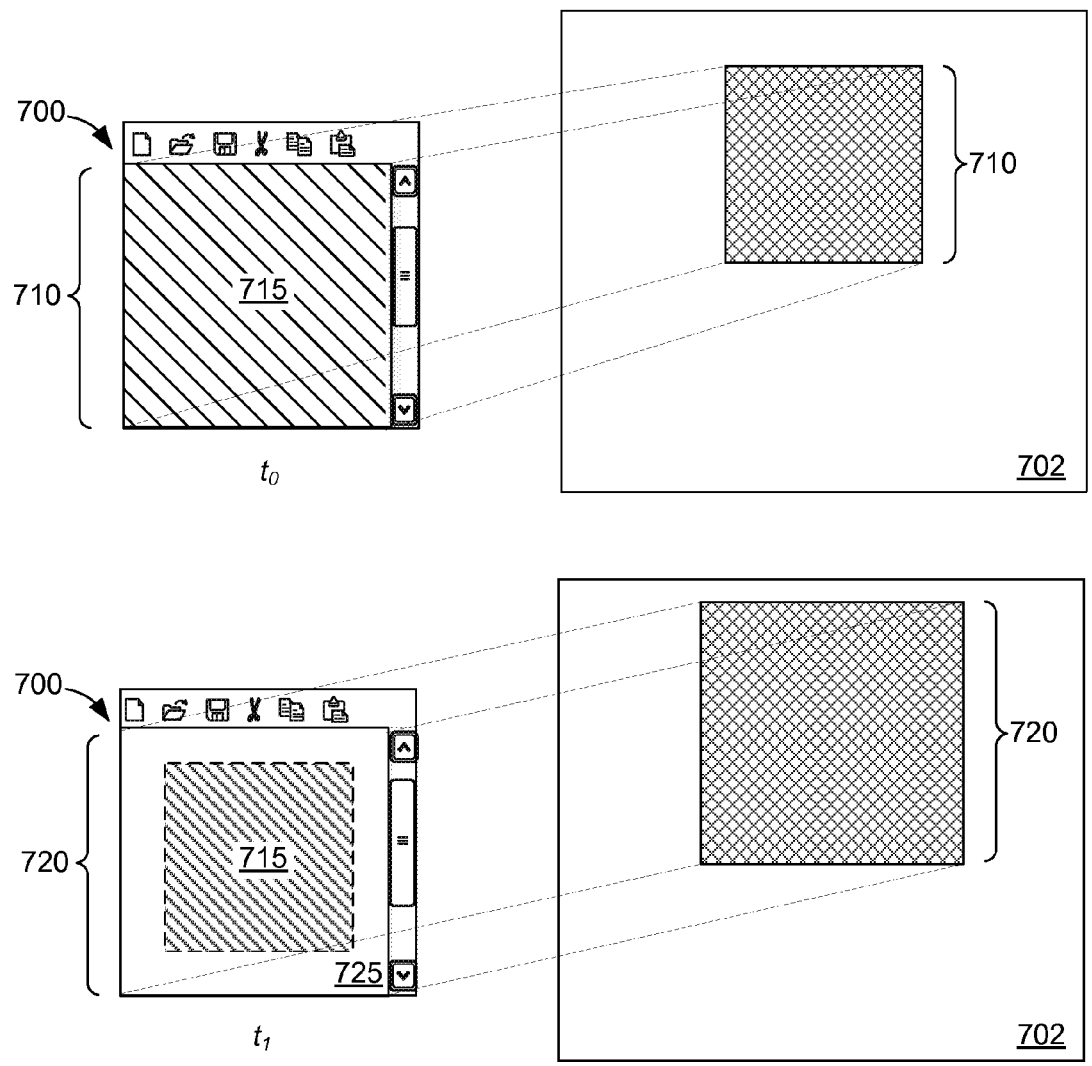
FIG. 7 illustrates zooming out of a portion of artwork in a view.

A similar technique can be used when a user zooms out from a portion of artwork in a view. FIG. 7 illustrates zooming out of a portion 710 of artwork 702 in a view 700. A first portion 710 of the artwork 702 drawn in the view 700 has a particular size and a first zoom level in the view 700. At time $t_0$, before the drawing of the first portion 710 is completed, a user provides input to zoom out from the first portion 710 to a second portion 720, where the first portion 710 intersects the second portion 720. In some circumstances, the first portion 710 is within the boundaries of the second portion 720. The input to draw the second portion 720 of the artwork 702 is accepted. The second portion 720 includes a first region 715 and a second region 725. The first region 715 is the first portion 710, and the second region 725 is adjacent to or surrounds the first portion 710 of the artwork 702.

In response to the input to zoom out from the first portion 710, the drawing of the first portion 710 is stopped before completion. When the drawing of the first portion 710 is stopped, the first region 715 is at a first level of completion.

After the drawing of portion 710 is halted, at time $t_1$, the second portion 720 of the artwork 702 is presented in the view 700. The second portion 720 in the view 700 now has the same size as the first portion 710 had in the view 700 before the zoom. The second portion 720 has a second zoom level in the view 700. In some implementations, the second zoom level is lower than the first zoom level. The second portion 720 can have a second zoom level (e.g., a second scale) in the view 700, e.g., by sampling the first portion 710 as drawn at time $t_0$ in the view. The first region 715 is decreased in size in the view 700. At this point, the first region 715 is still at the first level of completion. The sampling of first portion 710 provides an approximation (e.g., a "chunkier" version) of a rendering of the first region 715 at the second zoom level.

The drawing operation begins to render the second region 725 at the second zoom level in the view 700. The second region 725 is partially rendered before continuing to render the sampled first region 715, because the second region 725 is newly exposed in the view 700 in response to the user's last action. The rendering of the second region 725 progresses until the rendering reaches a second level of completion. This second level of completion is approximately the same as the first level of completion. In some implementations, the second level of completion is equal to the first level of completion.

The first region is joined with the second region into a third region. When the drawing continues, the third region has the same size as the first portion 710 had in the view 700. The third region is rendered at the second zoom level in the view 700. The drawing continues for the joined first and second regions at their respective levels of completion.

In some implementations, the rendering operation uses an off-screen buffer. Once the drawing thread at the first zoom level is terminated, a drawing thread for the entire second portion 720 can begin at the second zoom level in the buffer. However, to avoid "flicker," the sampled first region 715 is not updated until the rendered second region 725 is approximately as far along in the drawing sequence at the second zoom level. When this occurs, the sampled first region 715 of the view 700 can be updated to the same first level of completion but at the second zoom level by copying the corresponding rendered region at the second zoom level from the buffer.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be or a computer-readable medium. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In some implementations, the key of a key-value pair indicates the percentage of completion of the region represented by the corresponding value. In some implementations, the rendering operation is not limited to only one active drawing thread at a time.

What is claimed is:

1. A computer-implemented method comprising:
   first drawing a first portion of an artwork in a view on a display device;
   before completion of the first drawing, accepting input to draw a second portion of the artwork in the view on the display device, the second portion including a first region and a second region, the first region being part of the first portion of the artwork in the view on the display device, the second region being adjacent to the first portion of the artwork;
   in response to the input, stopping the first drawing before completion at a first level of completion;
   second drawing the second region in the view on the display device until progress of the second drawing reaches a second level of completion that is approximately the same as the first level of completion;
   joining the partially drawn first region and the partially drawn second region into a third region; and
   third drawing the third region in the view on the display device where the third drawing resumes drawing of the first and second regions at their respective levels of completion; a list of indicators represents the level of completion of regions of the artwork, wherein each indicator includes a key that represents a position in a drawing sequence and a value that represents a drawn region.

2. The computer-implemented method of claim 1, where the first region drawn during the first drawing is not erased.

3. The computer-implemented method of claim 1, where drawing is performed by a single drawing thread.

4. The computer-implemented method of claim 3, where only one drawing thread is active at a time.

5. The computer-implemented method of claim 1, where the artwork comprises a plurality of elements, each element having a sequential position in a drawing sequence.

6. The computer-implemented method of claim 5, where a level of completion is relative to the number of elements in the drawing sequence which have been drawn.

7. The computer-implemented method of claim 5, further comprising:
   maintaining the list of indicators for the level of completion of regions of the artwork.

8. The computer-implemented method of claim 1, where the input corresponds to scrolling the view of the artwork in a display.

9. A computer-implemented method comprising:
   first drawing a first portion of an artwork in a view on a display device, the first portion having a first size and a first zoom level in the view on the display device;
   before completion of the first drawing, accepting input to draw a second portion of the artwork in the view on the display device, the second portion included within the first portion, the second portion having a second size and the first zoom level in the view on the display device, the second size being smaller than the first size, the second portion including a first region and a second region;
   in response to the input, stopping the first drawing before completion, the first region being at a first level of completion, the second region being at a second level of completion, the first level of completion being a higher level of completion than the second level of completion;

second drawing the second region at a second zoom level in the view on the display device until progress of the second drawing reaches a third level of completion that is approximately the same as the first level of completion, the second zoom level being higher than the first zoom level;

joining the partially drawn first region and the partially drawn second region into a third region; and third drawing the third region in the view on the display device where the third drawing resumes drawing of the first and second regions at their respective levels of completion, the third region having the first size and the second zoom level in the view on the display device; a list of indicators represents the level of completion of regions of the artwork, wherein each indicator includes a key that represents a position in a drawing sequence and a value that represents a drawn region.

10. The computer-implemented method of claim 9, further comprising:

presenting a sampled version of the second portion of the artwork in the view on the display device, the second portion having the first size and sampled at the second zoom level in the view on the display device, the first region and the second region increased in size in the view on the display device proportionate to the increase in size from the second size to the first size, the first region being at the first level of completion, the second region being at the second level of completion.

11. A computer-implemented method comprising:

first drawing a first portion of an artwork in a view on a display device, the first portion having a size and a first zoom level in the view on the display device;

before completion of the first drawing, accepting input to draw a second portion of the artwork in the view on the display device, the first portion included within the second portion, the second portion including a first region and a second region, the first region being the first portion, the second region being adjacent to the first portion of the artwork;

in response to the input, stopping the first drawing before completion, the first region being at a first level of completion;

second drawing the second region at a second zoom level in the view on the display device until progress of the second drawing reaches a second level of completion that is approximately the same as the first level of completion, the second zoom level being lower than the first zoom level;

joining the partially drawn first region and the partially drawn second region into a third region; and third drawing the third region in the view on the display device where the third drawing resumes drawing of the first and second regions at their respective levels of completion, the third region having the same size and the second zoom level in the view on the display device; a list of indicators represents the level of completion of regions of the artwork, wherein each indicator includes a key that represents a position in a drawing sequence and a value that represents a drawn region.

12. The computer-implemented method of claim 11, further comprising:

presenting a sampled version of the second portion of the artwork in the view on the display device, the second portion having the same size and sampled at the second zoom level in the view on the display device, the first region decreased in size in the view on the display device, the first region being at the first level of completion.

13. A computer program product, encoded on a computer readable storage device, operable to cause data processing apparatus to perform operations comprising:

first drawing a first portion of an artwork in a view;

before completion of the first drawing, accepting input to draw a second portion of the artwork in the view, the second portion including a first region and a second region, the first region being part of the first portion of the artwork in the view, the second region being adjacent to the first portion of the artwork;

in response to the input, stopping the first drawing before completion at a first level of completion;

second drawing the second region in the view until progress of the second drawing reaches a second level of completion that is approximately the same as the first level of completion;

joining the partially drawn first region and the partially drawn second region into a third region; and third drawing the third region in the view where the third drawing resumes drawing of the first and second regions at their respective levels of completion; a list of indicators represents the level of completion of regions of the artwork, wherein each indicator includes a key that represents a position in a drawing sequence and a value that represents a drawn region.

14. The computer program product of claim 13, where the first region drawn during the first drawing is not erased.

15. The computer program product of claim 13, where drawing is performed by a single drawing thread.

16. The computer program product of claim 15, where only one drawing thread is active at a time.

17. The computer program product of claim 13, where the artwork comprises a plurality of elements, each element having a sequential position in a drawing sequence.

18. The computer program product of claim 17, where a level of completion is relative to the number of elements in the drawing sequence which have been drawn.

19. The computer program product of claim 17, further comprising:

maintaining the list of indicators for the level of completion of regions of the artwork.

20. The computer program product of claim 13, where the input corresponds to scrolling the view of the artwork in a display.

21. A computer program product, encoded on a computer readable storage device, operable to cause data processing apparatus to perform operations comprising:

first drawing a first portion of an artwork in a view, the first portion having a first size and a first zoom level in the view;

before completion of the first drawing, accepting input to draw a second portion of the artwork in the view, the second portion included within the first portion, the second portion having a second size and the first zoom level in the view, the second size being smaller than the first size, the second portion including a first region and a second region;

in response to the input, stopping the first drawing before completion, the first region being at a first level of completion, the second region being at a second level of completion, the first level of completion being a higher level of completion than the second level of completion;

second drawing the second region at a second zoom level in the view until progress of the second drawing reaches a third level of completion that is approximately the same as the first level of completion, the second zoom level being higher than the first zoom level;

joining the partially drawn first region and the partially drawn second region into a third region; and third drawing the third region in the view where the third drawing resumes drawing of the first and second regions at their respective levels of completion, the third region having the first size and the second zoom level in the view; a list of indicators represents the level of completion of regions of the artwork, wherein each indicator includes a key that represents a position in a drawing sequence and a value that represents a drawn region.

22. The computer program product of claim 21, further comprising:

presenting a sampled version of the second portion of the artwork in the view, the second portion having the first size and sampled at the second zoom level in the view, the first region and the second region increased in size in the view proportionate to the increase in size from the second size to the first size, the first region being at the first level of completion, the second region being at the second level of completion.

23. A computer program product, encoded on a computer readable storage device, operable to cause data processing apparatus to perform operations comprising:

first drawing a first portion of an artwork in a view, the first portion having a size and a first zoom level in the view;

before completion of the first drawing, accepting input to draw a second portion of the artwork in the view, the first portion included within the second portion, the second portion including a first region and a second region, the first region being the first portion, the second region being adjacent to the first portion of the artwork;

in response to the input, stopping the first drawing before completion, the first region being at a first level of completion;

second drawing the second region at a second zoom level in the view until progress of the second drawing reaches a second level of completion that is approximately the same as the first level of completion, the second zoom level being lower than the first zoom level;

joining the partially drawn first region and the partially drawn second region into a third region; and third drawing the third region in the view where the third drawing resumes drawing of the first and second regions at their respective levels of completion, the third region having the same size and the second zoom level in the view; a list of indicators represents the level of completion of regions of the artwork, wherein each indicator includes a key that represents a position in a drawing sequence and a value that represents a drawn region.

24. The computer program product of claim 23, further comprising:

presenting a sampled version of the second portion of the artwork in the view, the second portion having the same size and sampled at the second zoom level in the view, the first region decreased in size in the view, the first region being at the first level of completion.

25. A system for incrementally updating the rendering of an artwork, the system comprising:

a display device;

means for first drawing a first portion of the artwork in a view on the display device;

before completion of the first drawing, means for accepting input to draw a second portion of the artwork in the view on the display device, the second portion including a first region and a second region, the first region being part of the first portion of the artwork in the view on the display device, the second region being adjacent to the first portion of the artwork;

in response to the input, means for stopping the first drawing before completion at a first level of completion;

means for second drawing the second region in the view on the display device until progress of the second drawing reaches a second level of completion that is approximately the same as the first level of completion;

means for joining the partially drawn first region and the partially drawn second region into a third region; and means for third drawing the third region in the view on the display device where the third drawing resumes drawing of the first and second regions at their respective levels of completion; a list of indicators represents the level of completion of regions of the artwork, wherein each indicator includes a key that represents a position in a drawing sequence and a value that represents a drawn region.

26. The system of claim 25, where the first region drawn during the first drawing is not erased.

27. The system of claim 25, where drawing is performed by a single drawing thread.

28. The system of claim 27, where only one drawing thread is active at a time.

29. The system of claim 25, where the artwork comprises a plurality of elements, each element having a sequential position in a drawing sequence.

30. The system of claim 29, where a level of completion is relative to the number of elements in the drawing sequence which have been drawn.

31. The system of claim 29, further comprising:

means for maintaining the list of indicators for the level of completion of regions of the artwork.

32. The system of claim 25, where the input corresponds to scrolling the view of the artwork in a display.

33. A system for incrementally updating the rendering of an artwork, the system comprising:

a display device;

means for first drawing a first portion of the artwork in a view on the display device, the first portion having a first size and a first zoom level in the view on the display device;

before completion of the first drawing, means for accepting input to draw a second portion of the artwork in the view on the display device, the second portion included within the first portion, the second portion having a second size and the first zoom level in the view on the display device, the second size being smaller than the first size, the second portion including a first region and a second region;

in response to the input, means for stopping the first drawing before completion, the first region being at a first level of completion, the second region being at a second level of completion, the first level of completion being a higher level of completion than the second level of completion;

means for second drawing the second region at a second zoom level in the view on the display device until progress of the second drawing reaches a third level of completion that is approximately the same as the first level of completion, the second zoom level being higher than the first zoom level;

means for joining the partially drawn first region and the partially drawn second region into a third region; and means for third drawing the third region in the view on the display device where the third drawing resumes drawing of the first and second regions at their respective levels of completion, the third region having the first size and the second zoom level in the view on the display device; a list of indicators represents the level of completion of regions of the artwork, wherein each indicator includes a key that represents a position in a drawing sequence and a value that represents a drawn region.

34. The system of claim 33, further comprising:

means for presenting a sampled version of the second portion of the artwork in the view on the display device, the second portion having the first size and sampled at the second zoom level in the view on the display device, the first region and the second region increased in size in the view on the display device proportionate to the increase in size from the second size to the first size, the first region being at the first level of completion, the second region being at the second level of completion.

35. A system for incrementally updating the rendering of an artwork, the system comprising:

a display device;

means for first drawing a first portion of the artwork in a view on the display device, the first portion having a size and a first zoom level in the view on the display device;

before completion of the first drawing, means for accepting input to draw a second portion of the artwork in the view on the display device, the first portion included within the second portion, the second portion including a first region and a second region, the first region being the first portion, the second region being adjacent to the first portion of the artwork;

in response to the input, means for stopping the first drawing before completion, the first region being at a first level of completion;

means for second drawing the second region at a second zoom level in the view on the display device until progress of the second drawing reaches a second level of completion that is approximately the same as the first level of completion, the second zoom level being lower than the first zoom level;

means for joining the partially drawn first region and the partially drawn second region into a third region; and means for third drawing the third region in the view on the display device where the third drawing resumes drawing of the first and second regions at their respective levels of completion, the third region having the same size and the second zoom level in the view on the display device; a list of indicators represents the level of completion of regions of the artwork, wherein each indicator includes a key that represents a position in a drawing sequence and a value that represents a drawn region.

36. The system of claim 35, further comprising:

means for presenting a sampled version of the second portion of the artwork in the view on the display device, the second portion having the same size and sampled at the second zoom level in the view on the display device, the first region decreased in size in the view on the display device, the first region being at the first level of completion.

* * * * *